Dec. 21, 1965  J. A. COOK, JR  3,225,201
CONSTANT TEMPERATURE HOT BEARING DETECTOR
Filed March 11, 1963
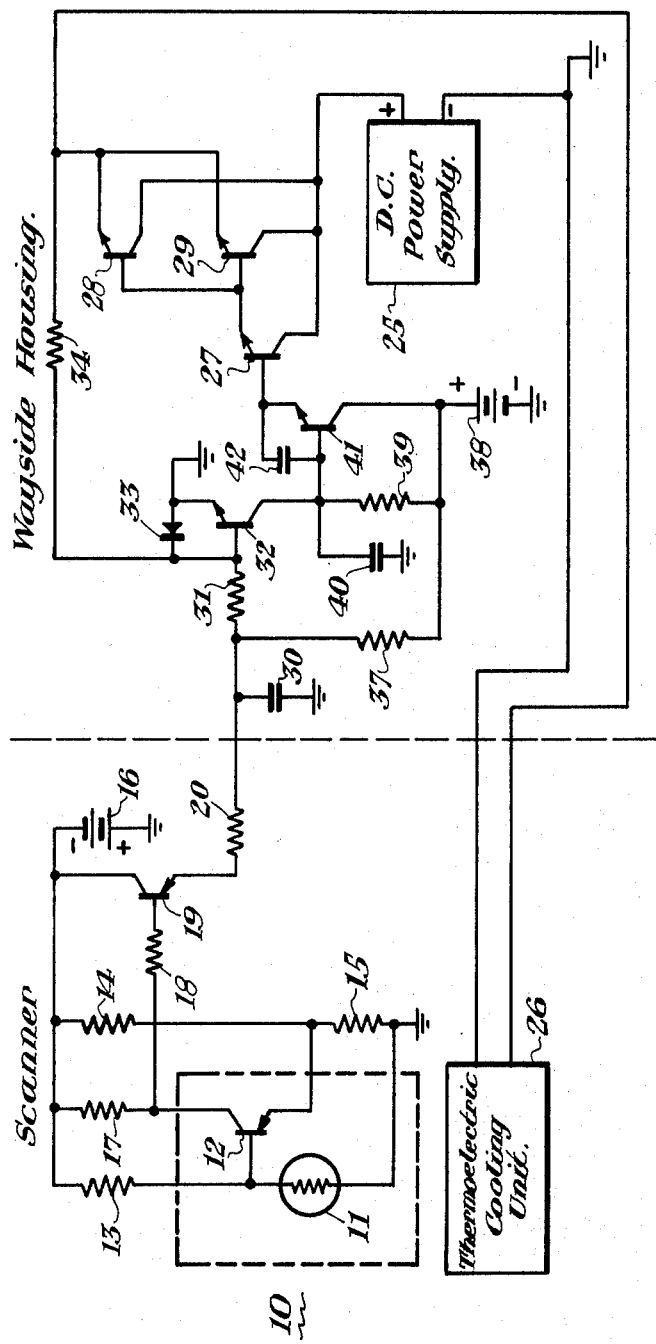
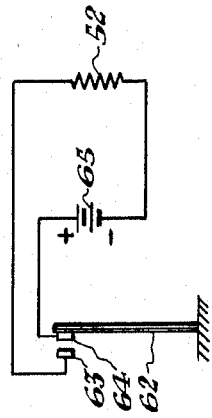
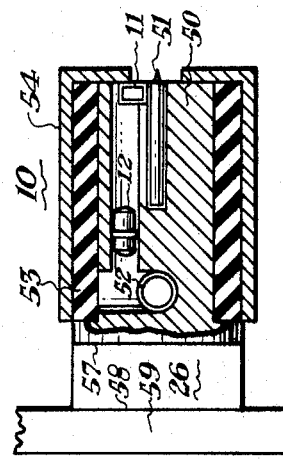
INVENTOR.
James A. Cook Jr.
BY
W. L. Stout
HIS ATTORNEY

United States Patent Office 3,225,201
Patented Dec. 21, 1965

3,225,201
CONSTANT TEMPERATURE HOT BEARING DETECTOR
James A. Cook, Jr., Wilkinsburg, Pa., assignor to Westinghouse Air Brake Company, Swissvale, Pa., a corporation of Pennsylvania
Filed Mar. 11, 1963, Ser. No. 264,172
4 Claims. (Cl. 250—83.3)

My invention relates to a device for detecting overheated journal bearings on a moving railway vehicle, and more particularly to means for maintaining the temperature of the detecting cell in such a device at a constant temperature.

In recent years there has developed the art of detecting overheated journal bearings on a moving railway vehicle by detecting infrared radiant energy emitted from these overheated journal bearings. In this art, an infrared radiant energy sensitive element is positioned at a railway track side, and a suitable optical system is provided which focuses emitted infrared radiant energy from a suitable point on a passing railway vehicle onto the sensitive element. For example, the element may "view" the hub of a passing wheel or the journal box directly. In either event, the infrared radiant energy sensitive element views or scans a point of a passing vehicle which becomes overheated and emits infrared radiant energy whenever the bearing of the vehicle becomes defective or overheated. The element responds to emitted infrared radiant energy to indicate an overheated bearing.

The basic theory of such hot bearing detection systems was understood before suitable infrared radiant energy sensitive elements were known to those skilled in the art, but such systems did not become practical until suitable detection elements were found. Today, materials such as indium antimonide which are extremely sensitive to infrared radiant energy are well known to those skilled in the art, and the use of such materials has resulted in practical hot bearing detection systems.

However, it has been found that the characteristics of such materials vary greatly with the ambient temperature in which the materials are located, with the magnitude of the output signal obtainable from such materials decreasing greatly as temperature increases and the noise output of such materials increasing greatly as temperature increases, thus causing a compound adverse effect on the critical signal-to-noise ratio of the output signal of such materials. As a result of this limitation, the use of automatic hot bearing detectors has been greatly restricted in areas subject to a widely varying ambient temperature.

It is accordingly an object of my invention to provide an improved hot bearing detection system.

It is yet another object of my invention to provide an improved hot bearing detection system which will operate satisfactorily in any ambient temperature range.

It is still another object of my invention to provide an improved hot bearing detection system in which the temperature of the infrared radiant energy sensitive element is maintained within a predetermined temperature range, regardless of the ambient temperature in which the system is located.

Briefly stated, and in accordance with one embodiment of my invention, a hot bearing detection system is provided which includes an infrared radiant energy sensitive element to detect the passage of an overheated railway bearing. The radiant energy sensitive element is positioned in a thermal compartment, which is in turn in thermal relation with the cold junction of a thermoelectric cooling unit. The temperature of the thermal compartment is monitored and whenever the temperature exceeds a predetermined temperature level, electric current is supplied to the thermoelectric cooling unit to remove heat from the thermal compartment. The thermal compartment also includes an electric resistance heater element positioned therein. Means are provided to supply electrical energy to the electric resistance heater unit whenever the ambient temperature in which the hot bearing detection system is located falls below another predetermined temperature. The thermal compartment is thus maintained within a predetermined temperature range which is selected to provide a suitable signal-to-noise ratio of the output signal of the infrared radiant energy sensitive element.

For a complete understanding of my invention, together with other objects and advantages thereof, reference may be made to the accompanying drawings in which:

FIG. 1 shows a schematic diagram of the thermal compartment and the means for removing thermal energy therefrom whenever the temperature exceeds a predetermined temperature;

FIG. 2 shows a sectional view of the thermal compartment which may be used with my invention; and FIG. 3 shows a schematic diagram of means for supplying heat to the thermal compartment whenever the ambient temperature falls below a predetermined temperature.

Automatic hot bearing detector systems customarily include a scanner positioned by the tracks, in which is mounted the infrared radiant energy sensitive element and suitable optical focusing means, and a nearby wayside housing, in which is positioned necessary circuits and other equipment. FIG. 1 shows a schematic diagram of a portion of my invention which includes components and circuits located at the track side scanner and other components and circuits located in the wayside housing. As shown in FIG. 1, a thermal compartment 10 has mounted therein a thermistor 11 and a transistor 12. FIG. 2, which will be later described, shows details of a suitable thermal compartment, and also shows the mounting of the thermistor 11 and transistor 12 and other components therein which are not shown in FIG. 1. Thermistor 11 and resistors 13, 14 and 15 form a bridge circuit which has one set of opposite terminals connected respectively between the negative electrode of battery 16 and a point of reference potential. The positive electrode of battery 16 is also connected to the point of reference potential. The base and emitter electrodes of transistor 12 are respectively connected to the other opposed pair of terminals of the bridge circuit. Resistance 17 serves as a load resistor for transistor 12, which also receives its energization from battery 16. The output signal of transistor 12 is coupled through resistance 18 to transistor 19, whose output signal is coupled through resistance 20 to the equipment in the wayside housing.

This bridge circuit arrangement provides an output signal whenever the temperature in the thermal compartment 10 exceeds a predetermined temperature, which in this shown example is 80° Fahrenheit. The following table shows values of these components which have been found satisfactory to provide such an output signal whenever the temperature of the thermal compartment 10 exceeds 80° Fahrenheit.

| | |
|---|---|
| Thermistor 11 | 5000 ohms, grade 1, ±2% |
| Transistor 12 | 2N536 |
| Resistance 13 | kiloohms  10 |
| Resistance 14 | do  2.2 |
| Resistance 15 | do  1 |
| Battery 16 | volts  12 |
| Resistance 17 | kiloohms  20 |
| Resistance 18 | do  1 |
| Transistor 19 | 2N527 |
| Resistance 20 | ohms  47 |

The output signal from the bridge circuit of the scanner location is further amplified by the circuits in the wayside housing and controls D.C. power supply 25, which supplies current to a thermoelectric cooling unit 26 at the scanner location. The output current of D.C. power supply 25 is controlled by controlling the conduction of transistors 27, 28 and 29. The circuit which further amplifies the signal received from the bridge circuit at the scanner location before applying it to the base electrode of transistor 27 forms no part of my invention. Suitable values for the circuit as shown may be:

| | |
|---|---|
| Transistor 27 | 2N1481 |
| Transistor 28 | 2N1703 |
| Transistor 29 | 2N1703 |
| Capacitance 30 microfarads | .02 |
| Resistance 31 kiloohms | 12 |
| Transistor 32 | 2N336A |
| Diode 33 | 1N540 |
| Resistance 34 kiloohms | 100 |
| Resistance 37 do | 12 |
| Battery 38 volts | 15 |
| Resistance 39 kiloohms | 4.7 |
| Capacitance 40 microfarads | .001 |
| Transistor 41 | 2N1481 |
| Capacitance 42 microfarads | .005 |

As is well known to those skilled in the art, a thermoelectric cooling unit such as unit 26 includes a cold junction and a hot junction and transfers heat from the cold junction to the hot junction as current flows through the cooling unit. The amount of heat transferred is a function of the magnitude of the current supplied to the thermoelectric cooling unit. The cold junction of thermoelectric cooling unit 26 is in thermal relation with thermal compartment 10, so as to remove heat energy from thermal compartment 10 whenever current is supplied to thermoelectric cooling unit 26. Thus, whenever the temperature of thermal compartment 10 exceeds 80° Fahrenheit, transistor 12 is rendered nonconductive by the bridge circuit and provides a more negative output signal to the amplifier in the wayside housing, which amplifier renders transistors 27, 28 and 29 conductive and current flows through these transistors into thermoelectric cooling unit 26. This current flow causes heat to be transferred from the cold junction, which is in thermal contact with thermal compartment 10, to the hot junction of the thermoelectric cooling unit, thereby lowering the temperature of thermal compartment 10. When the temperature of thermal compartment 10 is reduced to 80°, the bridge circuit no longer provides a more negative output signal, transistors 27, 28 and 29 are rendered less nonconductive and less current flows from D.C. power supply 25 to the thermoelectric cooling unit 26.

In accordance with one of the features of my invention, transistor 12 is also positioned in thermal compartment 10. Since this transistor is required to amplify a relatively small signal, it is important that the transistor operate at an optimum point in its characteristics. By also positioning transistor 12 in thermal compartment 10, it becomes unnecessary to provide any temperature compensating circuits for the transistor.

FIG. 2 shows details of the structure and mounting arrangement of the thermal compartment 10 of FIG. 1. Thermal compartment 10, for example, may consist of a copper cylinder or pedestal 50 suitably machined to receive the components to be mounted therein and suitably insulated to maintain a constant temperature. Mounted in the copper pedestal 50 is an infrared radiant energy sensitive element 51, such as an indium antimonide cell. As is well known to those skilled in the art, suitable optical means (not shown) focus infrared radiant energy onto cell 51 from the chosen point through which a passing train moves to detect the presence of an overheated journal box. Also mounted in the copper pedestal 50 is the thermistor 11 and transistor 12 of FIG. 1 and an electrical resistance heater 52, whose function will be later explained. Thermistor 11 is mounted as close as practical to cell 51, so that its temperature will be as nearly as possible the same as that of cell 51. Suitable heat insulating material 53 surrounds the copper pedestal 50 and a magnetic shield 54 surrounds the complete assembly, leaving only an opening through which cell 51 may be focused. The base of the copper pedestal 50 is mounted in thermal relation but electrically insulated from the cold junction 57 of thermoelectric cooling unit 26. The hot junction 58 of thermoelectric cooling unit 26 is mounted in thermal relation but electrically insulated from a suitable heat sink 59, which may be connected to the housing of the scanner unit to dissipate the heat removed from the thermal compartment 10. Electrical connections to the components mounted in the copper pedestal 50 are not shown in FIG. 2.

As was previously explained, it is desirable to maintain the temperature of the detecting cell 51 in a constant range. The arrangement which has just been described assures that the temperature of the unit does not exceed 80° Fahrenheit. However, it is also desirable to prevent the temperature of thermal compartment 10 from falling below this temperature also, so that cell 51 always operates at the same point in its characteristics. This could be effected by providing D.C. power of the opposite polarity to thermoelectric cooling unit 26 whenever the temperature of the thermal compartment 10 fell below the predetermined temperature. As is well known in those skilled in the art, whenever the current supplied to a thermoelectric cooling unit is reversed, the previous hot junction becomes the cold junction, the previous cold junction becomes the hot junction, and heat is thereby transferred in the opposite direction through the thermoelectric cooling unit. However, such an arrangement would require a separate D.C. power supply and temperature detecting and amplifying circuits and would greatly add to the expense of the system. In accordance with another feature of my invention, this problem is easily and economically solved.

The electrical resistance heater 52 positioned in thermal compartment 10 is energized whenever the ambient temperature in which the scanner is located falls below a predetermined temperature slightly higher than the temperature which it is desired to maintain the unit, such as 85° Fahrenheit. Thus, whenever the ambient temperature in which the unit is located falls below 85° Fahrenheit, electrical resistance heater 52 is energized and supplies heat to thermal compartment 10. As long as the temperature of thermal compartment 10 remains above 80° Fahrenheit, thermoelectric cooling unit 26 is energized, as was previously described in connection with FIG. 1, and removes heat energy from thermal compartment 10. If thermoelectric cooling unit 26 is chosen to be capable of removing more heat from the thermal compartment 10 than electrical resistance heater unit 52 is capable of supplying to thermal compartment 10, the temperature of thermal compartment 10 is maintained at 80° Fahrenheit. However, if the ambient temperature in which the scanner unit is located is greater than 85° Fahrenheit electrical resistance heater 52 is not energized, and if the temperature of thermal compartment 10 exceeds 80° Fahrenheit, the thermoelectric cooling unit 26 removes a sufficient amount of heat from the thermal compartment 10 to maintain the temperature at a constant 80° Fahrenheit.

FIG. 3 shows a schematic arrangement for the control of electric resistance heater unit 52. A bimetallic thermostat 62 is positioned in such a place as to measure the ambient temperature, such as on the housing of the scanner unit. Whenever the temperature falls below 85° Fahrenheit, contacts 63 and 64 are closed and unit 52 is energized from battery 65. Whenever the ambient temperature is above 85° Fahrenheit, contacts 63 and 64 are opened and no energy is supplied to unit 52.

While my invention has thus been disclosed and a specific embodiment described, it is understood that my invention is not limited to this shown embodiment. Instead, many modifications will occur to those skilled in the art which lie within the spirit and scope of my invention. It is thus intended that my invention be limited in scope only by the appended claims.

Having thus described my invention, what I claim is:

1. In a hot bearing detector which includes an infrared energy sensitive element for detecting an overheated bearing on a moving railway vehicle, the combination comprising, a thermal compartment, means for mounting said infrared energy sensitive element in said thermal compartment, a thermoelectric cooling unit including a cold junction, means for mounting said thermal compartment in thermal relation with the cold junction of said thermoelectric cooling unit, a thermistor mounted in said thermal compartment, a bridge circuit including said thermistor, a transistor for amplifying an output signal from said bridge circuit, means for mounting said transistor in said thermal compartment, and means responsive to the output signal of said transistor for energizing said thermoelectric cooling unit whenever the temperature in said thermal compartment exceeds a predetermined temperature.

2. In a hot bearing detector which includes an infrared energy sensitive element for detecting an overheated bearing on a moving railway vehicle, the combination comprising, a thermal compartment, means for mounting said infrared energy sensitive element in said thermal compartment, a thermoelectric cooling unit including a cold junction, means for mounting said thermal compartment in thermal relation with the cold junction of said thermoelectric cooling unit, a thermistor mounted in said thermal compartment, a bridge circuit including said thermistor, a transistor for amplifying an output signal from said bridge circuit, means for mounting said transistor in said thermal compartment, means responsive to the output signal of said transistor for energizing said thermoelectric cooling unit whenever the temperature of said thermal compartment exceeds a first predetermined temperature, and means for adding heat to said thermal compartment whenever the ambient temperature in which said hot bearing detector is located falls below a second predetermined temperature.

3. In a hot bearing detector which includes an infrared energy sensitive element for detecting an overheated bearing on a moving railway vehicle, the combination comprising, a thermal compartment, means for mounting said infrared energy sensitive element in said thermal compartment, a thermoelectric cooling unit including a cold junction, means for mounting said thermal compartment in thermal relation with the cold junction of said thermoelectric cooling unit, a thermistor mounted in said thermal compartment, a bridge circuit including said thermistor, a transistor for amplifying an output signal from said bridge circuit, means for mounting said transistor in said thermal compartment, means responsive to the output signal of said transistor for energizing said thermoelectric cooling unit whenever the temperature of said thermal compartment exceeds a first predetermined temperature, an electric heating element mounted in said thermal compartment, and means responsive to the ambient temperature in which said hot bearing detector is located for energizing said electric heating element whenever said ambient temperature falls below a second predetermined temperature.

4. In a hot bearing detector which includes an infrared energy sensitive element for detecting an overheated bearing on a moving railway vehicle, the combination comprising, a copper pedestal, means for mounting said infrared energy sensitive element in said copper pedestal, a thermoelectric cooling unit including a cold junction, means for mounting said copper pedestal in thermal relation with the cold junction of said thermoelectric cooling unit, a thermistor mounted in said copper pedestal, a bridge circuit including said thermistor, a transistor for amplifying an output signal from said bridge circuit, means for mounting said transistor in said copper pedestal, means responsive to the output signal of said transistor for energizing said thermoelectric cooling unit whenever the temperature of said copper pedestal exceeds a first predetermined temperature, an electric heating element mounted in said copper pedestal, and means responsive to the ambient temperature in which said hot bearing detector is located for energizing said electric heating element whenever said ambient temperature falls below a second predetermined temperature.

References Cited by the Examiner

UNITED STATES PATENTS

| | | |
|---|---|---|
| 2,811,856 | 11/1957 | Harrison. |
| 2,927,464 | 3/1960 | Howell et al. |
| 3,040,176 | 6/1962 | Rempka et al. _____ 246—169 X |
| 3,086,108 | 4/1963 | Kaehms _____ 246—169 |

FOREIGN PATENTS 613,116  11/1948  Great Britain.

OTHER REFERENCES

An article titled, "Low Temperature Radiation Pyrometry in Industry," by Mouzon et al., appearing on pages 203–209 in March 1949 issue of the "Journal of the Optical Society of America."

RALPH G. NILSON, *Primary Examiner.*

LEO QUACKENBUSH, *Examiner.*